METHOD OF AND APPARATUS FOR RECORDING PICTURE SIGNALS, OBTAINED BY SCANNING PICTURE ORIGINALS TO BE REPRODUCED, WITH STEADILY VARIABLE REPRODUCTION SCALE

Filed Dec. 23, 1964 2 Sheets-Sheet 1

Inventors.
Roman Koll, &
Fritz-Otto Zeyen.
By Slee & Slee Attys.

Sept. 13, 1966 R. KOLL ET AL 3,272,918

METHOD OF AND APPARATUS FOR RECORDING PICTURE SIGNALS, OBTAINED BY SCANNING PICTURE ORIGINALS TO BE REPRODUCED, WITH STEADILY VARIABLE REPRODUCTION SCALE

Filed Dec. 23, 1964 2 Sheets-Sheet 2

Inventors.
Roman Koll, &
Fritz-Otto Zeyen
By Stiee & Stiee Attys.

United States Patent Office 3,272,918

Patented Sept. 13, 1966

3,272,918

METHOD OF AND APPARATUS FOR RECORDING PICTURE SIGNALS, OBTAINED BY SCANNING PICTURE ORIGINALS TO BE REPRODUCED, WITH STEADILY VARIABLE REPRODUCTION SCALE

Roman Koll, Kiel-Wellingdorf, and Fritz-Otto Zeyen, Kitzeberg, near Kiel, Germany, assignors to Dr.-Ing. Rudolf Hell Kommanditgesellschaft Kiel, a German company Filed Dec. 23, 1964, Ser. No. 420,832
Claims priority, application Germany, Dec. 27, 1963, H 51,239
17 Claims. (Cl. 178—6.6)

Figure 1:
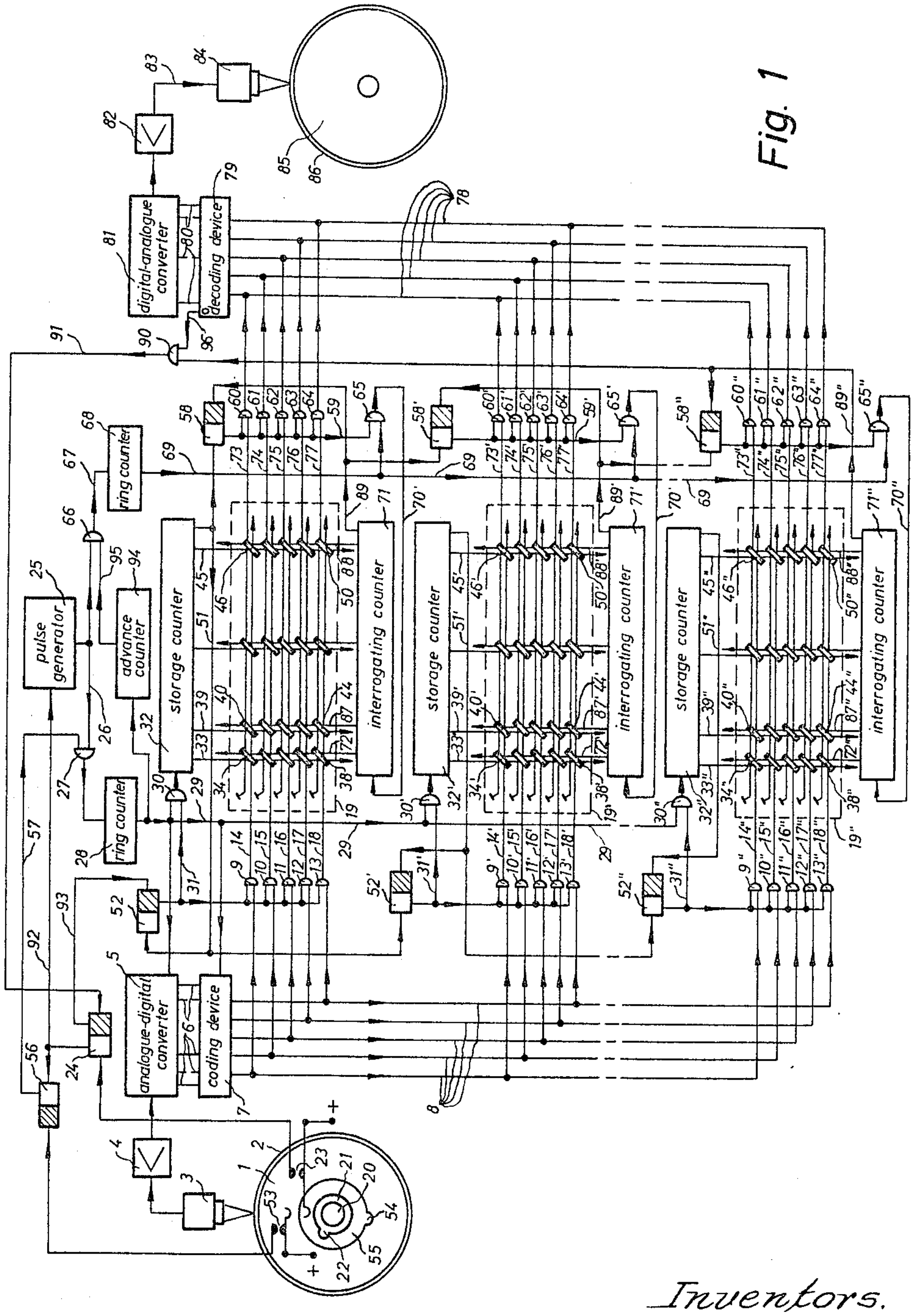

The present invention relates to a method of and apparatus recording picture signals, obtained by scanning picture originals to be produced, with steadily variable reproduction scale, using rotating drums for tensioning the picture originals and the recording carriers.

In the art of electro-mechanical reproduction, drum-apparatus, inter alia, are used. Distinction should be drawn as between the electro-mechanical production of printing blocks, and the electro-optical production of a set of corrected photographic colour separation negatives, from which a set of colour separation printing blocks can be etched by chemigraphical processes.

With engraving machines, a mono- or polychromatic picture original is tensioned over a rotatable drum, and photoelectrically scanned point-by-point in consecutive lines. Instead of the coloured picture original itself, several uncorrected photographic mono-chromatic colour separation negatives, produced therefrom, may also be used. By the scanning process, one picture signal or several picture signals is/are obtained which may be used, after tone or colour correction, to control one engraving tool or several engraving tools, which engrave screen elements in one foil or several foils of printing block material which is/are tensioned over a second rotatable drum. When the reproduction scale is 1:1, both drums have the same speed of rotation and the same diameter, so that they can be coupled rigidly together, or, instead of two drums, a single drum may alternately be used.

The scanning and engraving members are moved slowly parallel to the drum-axes and along the generating lines of the drum, closely adjacent the drum surfaces, by means of supports—similarly as in a lead screw lathe. These rectilinear advance movements may be undertaken continuously or discontinuously after every drum rotation. In the first case, the scanning or engraving lines following a helical path, in the other case, they follow equi-distant circles. The amount of advance per drum rotation is determined by the screen number, that is, by the number of the scanning or recording lines per unit of length, which is known as the line density. Original and reproducing drums, on the other hand, or scanning—and engraving members, on the other hand, must move in opposite directions, so that the printing blocks become mirror images of the picture original, which is necessary for the prints to become laterally correct.

With colour correction machines or "colour scanners" the arrangement on the picture drum is the same as the engraving machines: a coloured picture original or, alternatively several uncorrected, photographic monochromatic colour separation negatives. Several photographic films are tensioned on the reproduction drum, on which films the corrected colour separation negatives are photographically recorded by means of recording lamps. In contradistinction to the engraving machines, the corrected colour separation negatives are produced, with colour scanners, laterally correct with the uncorrected colour separation negatives or the coloured original, so that the original drum and the reproduction drum, on the one hand, and scanning and recording-members, on the other hand, move in the same direction.

Furthermore, drum-apparatus are known, wherein the reproduction scale can be altered in fixed steps. This is effected by giving the picture or the reproduction drum which have the same diameter at a 1:1 reproduction scale, different diameters, but equal rotation speeds. Then the ratio between the length of a line of the reproduction and the length of a line of the original is the same as that between the peripheral speeds of the associated drums, i.e., at the same speed of rotation, as that between its diameteres. If care is taken to ensure the ratio between the advance speeds or between the amounts of advance of the recording and the scanning members, is the same as the ratio of the drum diameters, the reproduction then becomes geometrically similar to the original. The disadvantage of this method consists in that one can alter the scale of reproduction only in a finite number of fixed steps, which requires an appropriate stocking of different sized drums, which becomes expensive and bulky with large numbers.

Another known method for altering the reproduction scale with drum apparatus, consists in causing the original drum and the reproduction drum each to effect a reciprocating rotation, both drums having the same diameter but rotating at different speeds. Instead of complete drums, partial drums can also be used, which do not extend over the whole periphery. However, such apparatus belong actually to the table or flat bed type of apparatus, since they are distinguished from them only in that the flat tables are bent into cylindrical ring sectors, but the mode of action, compared with the flat bed apparatus, is not altered. If on the other hand, the drum effect continuous rotations, an apparatus of this type with the same diameters and different speeds of rotation of the drums, is not suitable for altering the reproduction scale, since an overlapping of pictures could result therefrom. The change of speed or rotation is effected in fixed steps by means of tooth wheel gearing.

Nowadays there are still no steadily variable change speed gears for rotatary movements which allow a once selected speed ratio to be adjusted with great precision and to be maintained over a long period with great constancy. It is true that there are steadily variable friction gears, cone-chain drives and hydraulic-drives. However, the constancy of the adjusted speed ratio is very much insufficient for present purposes.

In contradistinction to rotary movements, it is possible, on the other hand, with rectilinear movements of two machine parts, to produce a steadily variable gear ratio between the strokes or speeds of the two parts with high constancy. A number of paralloleogram and lever mechanisms is known for this purpose. Such mechanisms can be used with the drum apparatus, to produce a steadily variable speed ratio between the rectilinear advance movements of the scanning and recording members.

These known mechanisms are used with the engraving machines and colour scanners of the table type—also known as flat bed apparatus—to produce a steadily adjustable gear ratio between the strokes and speeds of the two tables or slides carrying the originals and the reproductions. An advantage of the flat bed engraving machines consists in that non-flexible, thick, flat, metallic printing blocks can be engraved with them, which is not possible with drum machines. A disadvantage is that one cannot as yet utilize the return movement of the table, so that idle time results, which lengthens the reproduction process.

In this respect the drum machines have advantages because, on account of the rotatable recording carrier, idle time is considerably reduced, provided that the periphery of the drum is utilized in some degree by the recording carrier.

The object of the present invention is a method enabling a steadily variable reproduction scale to be adjusted and controlled with drum machines, without one of the two drums having to be replaced by drums of different diameter.

According to the invention, all of the drums are rotated at the same speed, the picture signals are stored, the stored picture signals are played back at any desired selected speed, the played back picture signals control the recording members, and the advance speed or the amount of advance of the scanning members relatively to the originals is adjusted corresponding to the recording scale determined by the ratio between playback and reading-in speed and the line density (screen number) selected when recording.

Figure 2:
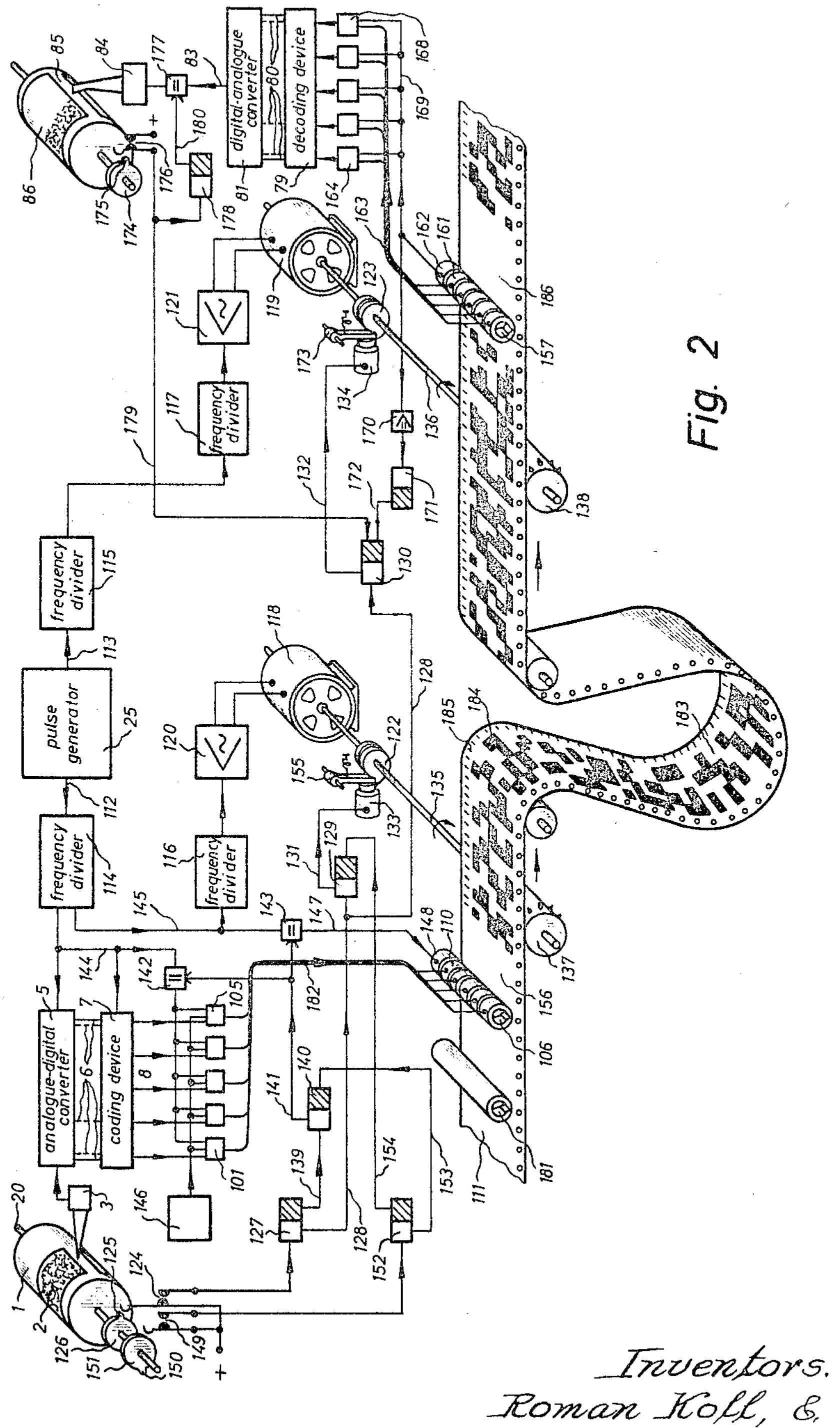

In order that the invention may be more clearly understood, reference will now be made to the accompanying drawings which show two embodiments thereof by way of example and in which:

FIG. 1 illustrates purely electronically operating reproduction equipment with ring core storage matrices; and FIG. 2 illustrates reproduction equipment with magnetic tape storage.

Referring to the drawings, in FIG. 1, on a rotating drum 1, the original 2 to be reproduced by means of the photo-electric scanning device 3 is scanned point-by-point and line-by-line, the scanned brightness values being changed into electrical voltages. These voltages are fed through the amplifier 4 to the analogue-digital converter 5, the outputs 6 of which are connected to the coding device 7.

The analogue-digital converter works in such a way that the scanned steady picture signal is periodically and momentarily sampled, and that the sampled discrete instantaneous amplitudes of the picture signal which amplitudes can have any value, are quantized in a finite number of discrete amplitude steps. Analogue-digital converters used in pulse-code-modulation techniques are known to those skilled in the art. The finite number of discrete amplitude steps corresponds to the finite number of discrete brightness steps of the picture signal, which steps, arranged according to rising or falling brightness, form a neutral stepped wedge. If $2^5=32$ discrete brightness steps between the darkest black and the brightest white are selected, then the discontinuous neutral wedge is perceived by the onlooker to be almost continuous. In general, 32 brightness steps are sufficient for the reproduction of half tone pictures. For the highest requirements, if for instance it is a question of fairly gradual tone value changes with a decided (marked) paucity of detail (for example the sky), a greater number of steps, for example $2^6=64$, must be selected.

In the coding device the finite number of voltage quanta supplied from the analogue-digital converter is numbered in a sequence arranged according to amplitudes, and the (ordinal) numbers are represented in the binary code. The binary code numbers, which consist only of the figures 0 and 1, are represented electrically by means of 5- or 6-digit pulse combinations, the figure 0 corresponding to the absence, and the figure 1 corresponding to the presence of a pulse.

The coding device 7 has five output conductors 8, which carry binary voltage combinations. The conductors 8 each connected parallel to five gates 9, 9′ . . . 9″ up to 13, 13′ . . . 13″ which are arranged in the input conductors 14, 14′ . . . 14″ up to 18, 18′ . . . 18″ of the ring core storage groups 19, 19′ . . . 19″ which are arranged in a multiple field. The individual groups are operated chronologically successively. The subdivision of the storer into groups is necessary for practical and technical reasons, for a single matrix of sufficient size cannot be produced and operated. On the shaft 20 of the drum 1 these is the cam disc 21 with the cam 22 which, at a determined angular position of the drum, namely at the beginning of a line-scanning at the lower edge of the original, operates the contact 23. This causes, with the help of the electronic switch 24, the pulse generator 25 to be switched on. The latter which, for instance, may work with the frequency 1 mc./s., supplies pulses of the frequency 1 mc./s. via the conductor 26 and the gate 27 to the ring-counter 28.

The following assumptions may be made: the desired enlargement ratio of the original to the reproduction may be 1:3, the scanning and recording speed of the original, that is, the peripheral speed of the drum 1, may be 30 cm./sec. The picture points of the reproduction may be 0.1 mm. x 0.1 mm. in size, and finally the edge of image of the picture reproduction located in the peripheral direction of the drum, may amount to 21 cm. The number of picture points to be stored per picture line amounts then to 2100, and the timing frequency with which the points must be recorded on the reproduction drum, is 3000/sec. At the original drum, the timing frequency, corresponding to the required ratio of enlargement, is 9000/sec. This timing frequency is obtained from the pulse frequency 1 mc./s. by division. The necessary ratio of division is produced by means of the ring counter 28 the number of steps of which is adjustable. At the end of every cycle the ring-counter 28 transmits a pulse to the conductor 29, thus producing the timing for the storage. The number of steps of the ring-counter is arbitrarily adjustable up to the maximum number of its counting cycle. In the case of the assumed example it is to be adjusted to $10^6/9000=111$, so that there results the timing frequency of 9000/sec.

The first of said timing pulses passes through the "AND" gate 30, since, as may be assumed for the present, the conductor 31 is live, so that the passing condition is fulfilled. The storage counter 32 moves into its first position and renders the first column conductor 33 of the ring core storage groups 19 live. The conductors 14 to 18 which form the row conductors of the matrix, are or are not live according to the brightness of the picture point which has just been scanned. The timing pulses in the timing conductor 29 also control the coding device 6 and the analogue-digital converter 5, so that the voltage combinations in the conductors 8 occur pulsewise and that at the same time as the voltages appear in the column conductor 33. The ferrite cores 34 to 38 located at the cross points of the conductor 33 with the live-parts of the conductors 14 to 18, are reversed magnetically and thus store the brightness information of the first picture point. The second timing pulse in the conductor 29 reaches the storage counter 32 via the gate 30 and switches on the second column conductor 39.

In the meantime, while scanning the picture original, the brightness of a further picture point has been quantized and coded, whereby another, or the same voltage combination occurs in the conductors 8, which combination reaches the conductors 14 to 18 via the gates 9 to 18. The ring cores 40 to 44 located at the cross points of the five-parts of the conductors 14 to 18 with the conductor 39, are reversed magnetically, whereby the brightness information of the second picture point is stored in the second ferrite core column. This process is repeated with every successive timing pulse in the conductor 29, until finally the last column conductor 45 of the storage counter 32 is reached, and the ring core column 46 to 50 is engaged. When the last step of the storage counter 29 is reached, a pulse is transmitted via the conductor 51, which pulse brings the electronic switch 52 into its operative position. Therewith the conductor 31 becomes dead, and the gates 9 to 13 and 30 are closed, because the passing condition is no longer fulfilled. The storage counter 32 and the row wires of the storage group 19 henceforth remain at rest. The aforementioned pulse in the conductor 51, however, also operates the switch 52' which renders the conductor 31' live. Therewith the AND-gate 30' of the second storage group 19' is prepared so that the next following pulse in the conductor 29 can pass through said gate 30', the storage counter 32' moves into its first position and renders the column conductor 33' live.

The voltage combination in the conductors 8, corresponding to the brightness of the picture point scanned at that moment, passes through the gates 9' to 13', since these also are prepared by means of the voltage in the conductor 31'. The ring cores 34' to 38' of the storage group 19' located at the cross points of the conductor 33' with the live-parts of the conductors 14' to 18', are magnetized and store the coded brightness information. The further following timing pulses on the conductor 39 successively magnetize the ring cores of the column conductors 39', etc., until finally the ring cores 46' to 50' of the last column conductor 45' are magnetized, and a pulse brings the switch 52', via the conductor 51', into its rest position, makes the conductor 31' dead, and thereby closes the gates 9' to 13' and 30'. However, the pulse in the conductor 51' also switches over the switch 52'' and prepares the gates 9'' to 13'' and 30''. The further timing pulses in the conductor 29 reach, via the gate 30'', the storage counter 32'', which, as has been described above, fills the ring core storage group 19''.

Of the many storage groups necessary, three are shown, namely the first two 19 and 19' and the last 19''. When the column conductor 45'' is reached, the last storage cell of the complete store is filled, and therewith the brightness information of the last picture point of the scanned picture line is stored. Via the conductor 51'' the switch 52'' is brought into its rest position, whereby the conductor 31'' becomes dead, and the gates 52'' and 9'' to 13'' are closed. The storage is therewith ended. For the case occurring frequently that the storage capacity is greater than is necessary for storing the number of picture points of a picture line, because, for instance, the picture original is small, or a coarse point screen was selected, the storage must be interrupted after the last point of the picture line has been scanned. For this purpose the contact 53 is provided, which is operated once for every drum rotation, by means of the cam 54 of the cam disc 55 which is fixed on the drum shaft 20. The cam disc 55 is adjustably arranged in the direction of rotation of the drum 1 on its shaft 20, and is so adjusted before the beginning of the scanning, that the contact 53 is operated when the end of the picture line is reached. Then a pulse is transmitted to the switch 56 which reverses and renders the conductor 57 dead. Therewith the AND-gate 27 is closed; no more pulses reach the ring-counter 28, which accordingly no longer supplies timing pulses to the conductor 29.

For reading out the stored picture point information from the storage, except when the recording scale is 1:1, another timing frequency is necessary, which is lower for enlargement and higher for reduction than the timing frequency of the storage. It is important that both timings are in fixed relation to each other. Therefore the timing frequency for the reading out is also derived from the master pulse generator 25. As assumed, a 3:1 enlargement of the picture original as against the reproduction is to be achieved by means of the change of scale. The timing frequency for the reading out is thus lower than that of the storage. It would therefore be possible, to begin immediately after the beginning of the storage with the reading out, that is, at the earliest, after the first picture point of the first picture line has been stored. However, in the embodiment a small temporary delay is introduced, that is the time which is necessary to fill the first storage group 19. After said time interval has elapsed, a pulse occurs in the conductor 51, which pulse, besides the already described effects, brings the electronic switch 59 into its operative position. Thereby the conductor 59 is made live, and the AND-gates 60 to 64 and 65 are prepared.

It is assumed, that, if enlargement is under consideration, the gate 66 is opened from the outset. Then the timing pulses pass from the conductor 26 via the gate 66 and the conductor 67 to the ring counter 68 which—like the ring counter 28—is adjustable for arbitrary numbers of steps. Since, as has been calculated above, the reading out timing in the assumed example must amount to 3000 pulses per second, the ring counter 68 must be adjusted to $10^6/3000=333$ steps. This means, that the counter is brought back into its starting position after every 333rd pulse released to the conductor 67.

At every resetting, a timing pulse occurs in the conductor 69, i.e. 3000 times per second in the case of example under consideration. The first pulse occurring in the conductor 69, i.e., 3000 times per second in the case of example under consideration. The first pulse occurring in the conductor 69 after the revision of the switch 58 reaches the input of the interrogation counter 71 via the gate 65 and the conductor 70. In this way the second column conductor 72 of the first ring core column is rendered live. The direction of the current flowing through the conductor 72 is opposite to the direction of current in the conductor 33 and effects the reverse magnetization of those ring cores of the first column which had been magnetized during reading in. One of the five reading conductors 73 to 77 passes through the ring core rows parallel to each of the five row conductors 14 to 18. In those of the five reading conductors 73 to 77 that pass through a reverse magnetized ring core, induction currents occur which reach the five conductors 78 via the prepared gates 60 to 64 in the form of pulses. In the decoding device 79, each time one of 32 voltage quanta is formed from the voltage combination which is offered at the input of the decoding device in the conductors 78 and said quantum is fed, via the conductors 80, to the digital-analogue converter 81, which forms a steady signal function from these quanta. The restored (regained) analogue voltage is fed to the recording member 84 via the amplifier 82 and the conductors 83, said member 84 recording a picture point on the recording carrier 86 stretched over the reproduction drum 85.

The second timing pulse on the conductor 69 switches the interrogating counter 71 into its second position via the gate 65 and the conductor 70. Therewith the second column conductor 87 becomes live, whereby the magnetized ring cores 40 to 44 in said column are reverse magnetized. Again pulse voltages are induced which reach the decoding device 79 via the reading conductors 73 to 77, the gates 60 to 64, and the conductors 78, and which reach the recording device 84 via the digital-analogue converter 81 and the amplifier 82, which recording device records the second picture point on the recording carrier 86 on the drum 85. This process is repeated with all following picture points, until, when the last step of the interrogating counter 71 has been reached, the last second column conductor 88 of the first storage group 19 is reached and said storage group is emptied by reverse-magnetizing the ring cores 46 to 50 arranged in said column. However, when the last step has been reached, a pulse is transmitted via the conductor 89, which pulse brings the switch 58 into its rest position and the switch 58' into its operative position. The conductor 59 becomes dead, and therewith the gates 60 to 64 and 65 are henceforth closed. However, at the same time the gates 60' to 64' and 65' are opened by means of the switch 58' via the conductor 59'. The next timing pulse in the conductor 69 reaches the interrogating counter 71' via the gate 65' and the conductor 70', which counter renders the first interrogating conductor 72' live, which, as has already been described in connection with the first storage group 19, releases the stored picture point information by reverse-magnetizing the ring cores 34' to 38' arranged in said column. The further proceeding corresponds exactly to that of the first storage group, until, after the last second column conductor 88' has been reached, the storage group 19' reverses the switch 58' by means of a pulse via the conductor 89' and switches on the switch 58''. The gates 60' to 64' and 65' are closed, and the gates 60'' to 64'' and 65'' are opened. Further pulses arriving on the conductor 69, reach the interrogating counter 71' in the manner described above via the gates 65'' and the conductor 89'', and these pulses pick up successively the picture informations stored in the last storage group 19''. When the last second column conductor 88'' has been reached, the last picture point information of the read-in picture line has been removed from the store, and the picture point is recorded; therewith the enlarged reproduction of the first line of the original is finished.

The pulse occurring in the conductor 89'', when the last column of the last storage group has been reached, closes, by reversing the switch 58'', the gate 60'' to 64'' and 65'', but moreover, it effects the revision of the switch 24 via the OR-gate 90 and the conductor 91. Therewith the conductor 92 becomes dead, and the pulse generator 25 is stopped. In order to prepare the scanning of the second picture line of the original, the switch 52, however, is brought into its operative position via the conductor 93 by a pulse occurring at the reversing of the switch 24. Therewith the conductor 31 becomes live and prepares (biases) the gates 9 to 13 and 30 of the first storage group 19. Until the cam contact 23 has been re-operated, which takes place after a complete rotation of the original drum 1 in the moment, when the edge of the picture original 2, located parallel to the drum axle, again becomes positioned in front of the scanning device 3, the equipment remains at rest.

If in a second example, a reduction of the reproduction compared with the original is to be made, then the times of reading-in and reading-out are in a different ratio from each other. If, for example, a reduction ratio of 2:1 be assumed, then the timing frequency in the conductor 69 is twice as great as that of the conductor 29. Furthermore, if the requirement demands that the length of the picture edge of the reproduction, around the periphery of the drum, is 16 cm. and the size of the picture points is 0.12 mm. x 0.12 mm., then, with the assumed peripheral speed of the drums 1 and 85 of 30 cm./sec., the reading-out timing frequency ratio is 2500 pulses per sec., and corresponding to the assumed reduction 2:1, the reading-in timing is 1250 pulses per sec. Corresponding to said members, the division ring-counter 28 must be adjusted at the reading-in post to 800 steps and the division ring-counter 68 must be adjusted at the reproduction post to 400 steps. Since reading-out is twice as fast as reading-in, the reading-in must be started before the reading-out, the amount of the head start being at least half as great as the total number of picture points of a line.

Since a line consists of 160:0.12∼1334 picture points, the reading-out may begin only if at least 667 picture points have been read-in. Therefore, at a reduced reproduction, the gate 66 is closed for the present. Advantageously, the start is made somewhat earlier, as would be necessary according to calculation, namely with as many picture points as a storage group is capable of storing, so that the reading-in of the last storage group is safely finished, whenever its reading-out begins. If, for example, a storage group has a storing capacity of 50 picture points, the advance of the reading-in would not amount to 667, but to about 700 picture points.

The advance is determined by means of the electronic advance counter 94. It is operated by means of the reading-in timing pulses in the conductor 29 and counts the reading-in picture points of every line, until the preset number of steps is reached. Then it stops, but at the same time renders the conductor 95 live. Thereby the AND-gate 66 is opened, and the timing pulses in the conductor 26 henceforth reach the division ring-counter 68, via the gate 66 and the conductor 67. In this way said counter begins to count, and supplies, as has already been described, after every cycle, a timing pulse to the conductor 69 for the reading-out.

The capacity of the total store must be so proportioned, that it is capable of still storing the number of picture points in a line of the largest possible picture (original or reproduction) with the smallest size of picture point met with (finest screen). In most cases, the reading-in will be finished, before the storage is completely filled. The finishing of the reading-in of each picture line and the resetting of the storage and interrogating counter is controlled by means of the cam contact 53. If said contact is closed at the end of a picture line, then the switch 56 returns into its rest position and closes the gate 27. Thereby the timing pulses disappear on the counter 29, after any ring core column in any storage group was engaged as the last. All consecutive columns remain disengaged. If, at the reading-out, the interrogation counter reaches the first of these disengaged columns, then no further pulse occurs in all five reading conductors 14'' to 18''. The conductors 78 convey to the decoding device 79 the combination "5 times no voltage." Said combination to which no brightness value is assigned, produces at the output "O" of the decoding device 79 a pulse which changes over the switch 24 into its rest position via the conductor 96, the OR-gate 90, and the conductor 91. Thereby the pulse generator 25 is switched off, and the whole installation is stopped. The pulse in the conductor 91 is further used to reset all storage counters, interrogating counters, division ring-counters, and the advance counter into the "O" position, so that every picture line to be scanned anew meets with exactly the same initial conditions by means of the control by the cam contact 23. Therewith it is guaranteed, that, at the reproduction, adjacent picture lines are produced without lateral displacement.

If the equipment relates to an engraving machine, then the recording member 84 is an engraving tool; if it relates to a colour correcting machine (scanner), then the recording member 84 is a recording lamp.

When coloured picture originals are to be reproduced, several simultaneously-operable ring core storage matrices are needed, corresponding to the number of colour separation negatives or colour separation printing blocks, namely one per each colour separation negative or colour separation printing block. The picture signals of the individual colour separation negatives are submitted to a colour correction in a computer either before their reading-in or after their reading-out. In the first case such a storage contains the corrected, and in the second case the uncorrected colour separation picture signals.

Instead, as described, to use only a single line storage device for storing the picture signals, the picture lines can also be stored alternately in one of two line storage devices, one of which is provided for the odd-numbered and the other is provided for the even-numbered picture lines. With this mode of operation, the filled storage device is interrogated each time, while the empty storage device is being filled. However, an equipment of this type would be very costly, because twice the number of line storage devices would be necessary, and because ring core storage devices are very expensive with the storage capacities here needed.

A second embodiment, illustrated in FIGURE 2, in principle is similar to the embodiment according to FIGURE 1. The difference consists primarily in that instead of an immovable magnetic core storage device, a movable magnetic tape is used as a storage device. As has already been mentioned, the ring core storage device needs more material and is therefore more expensive, and this is a disadvantage compared with the use of the magnetic tape storage device. The magnetic tape, on the contrary, is relatively inexpensive. However, besides the drums, mechanically moving parts are necessary, viz. the magnetic tape itself and the motors for driving same. The tape drive must be manufactured with great precision, since the requirements for exactitude in the present case are much higher than with ordinary tape recorders.

Both embodiments have in common that the brightness values of the picture points are stored digitally in quantized and coded form. Similarly to the embodiment of FIGURE 1, the binary five-unit code may also be used in the arrangement of FIGURE 2, which has the possibility of assigning to each picture point one of 32 discrete brightness steps.

The five outputs 8 of the coding device 7 are fed via the gate 101 to 105 and the cable 182 to the five magnetic recording heads 106 to 110. With each of these heads a track is recorded on the magnetic tape 111 which is perforated on one side. The five tracks correspond to the five rows of ring cores of the embodiment using magnetic core storage devices according to FIGURE 1.

The reading-in of a picture line on the magnetic tape 111 is effected in that each scanned picture point of the original 2 effects the excitation of one each of the 32 possible combinations of the five recording heads 106 to 110. For this purpose a timing is necessary, which corresponds to the picture point frequency. The enlargement or reduction of the reproduction compared with the picture original is achieved by having the magnetic tape travel past the recording heads faster or slower than at the playback heads. The scale of reproduction is therefore given by means of the ratio of the tape speeds which are different at the recording and the playback end. At the beginning of every rotation of the original and reproduction drums which have the same diameter and speed of rotation, the tape starts simultaneously at the recording and playback end. While a picture line is being recorded, the stored preceeding picture line is played back. The changes in length of the portion of magnetic tape between the recording and the playback heads which occur during each transmission of a picture line, are compensated in the balancing loop 183. These portions of tape are always equal at the end of a transmission of a line, since a balance results by correspondingly longer resting times of the faster working drive. The drive of the tape at the recording and playback end is achieved by means of synchronous motors. Their operating frequencies are in the ratio determined by the required reproduction scale. As with the embodiment according to FIGURE 1, there is a master timing generator 25, which works at a high, constantly maintained frequency of, for example 1 mc./s. The two frequency divider devices 114 and 115 are connected via the conductors 112 and 113, the division ratios, as in the example according to FIGURE 1, being variable in whole numbers.

When choosing the individual sizes of adjustment it must be started from the reproduction end. It is assumed that the picture line to be recorded along the periphery of the drum is 40 cm. long, and that of the size of the picture point is 0.16 mm. x 0.16 mm. The number of the picture points per line then amounts to 2500. Furthermore, if the peripheral speed of the drums is 30 cm./sec., the picture point frequency, when reproducing, then is: $\frac{30}{40} \times 2500 = 1875$/sec. The picture edge of the original corresponding to the picture edge of the reproduction of 40 cm. length, may have the length 14 cm. Hence the ratio of reproduction is calculated at 2.86. The picture point frequency, when scanning the original, then amounts to 5360/sec.

From the calculated picture point frequencies the division ratios to be adjusted result in:

$10^6/1875 = 533$ for the reproducing end, and
$10^6/9532 = 187$ for the scanning end.

The working alternating voltages for the synchronous motors 118 and 119 are obtained from the A.C. voltage of 5360 c./s. at the output of the frequency divider 114 and from that of 1875 c./s. at the output of the frequency divider 115, by means of further divisions in the frequency dividers 116 and 117. These motors should work within a frequency range of 35 to 150 c./s. The working frequency for the motor with the lowest speed should therefore amount to at least 35 c./s., and the frequency with the highest speed, at the most to 150 c./s. This is achieved, if the division ratio of the frequency dividers 116 and 117 is made 40:1. The working frequency of the motor 118 at the scanning end is then 134 c./s., and that of the motor 119 at the reproducing end is 47 c./s. The power amplifiers 120 and 121 supply the power necessary for the motors. The motors work continuously during the operation of the equipment. The periodically occurring tape transports are effected by coupling the tape drive rollers 137 and 138 to the motor shafts 135 and 136 by means of the clutches 122 and 123. The tape drive thus operates in a start-stop manner.

For a clearer understanding of the operation of the apparatus, it will be assumed, that the transmission has already been started. The processes are considered during one drum revolution. At that time a picture line is scanned on the original 2 and stored on the magnetic tape 111. At the same time, the picture line which has been previously read-in, is picked up on the tape, and subsequently recorded. Shortly before the scanning beam reaches the one edge of the original 2, tensioned over the rotating original-drum 1, the contact 124 is closed which is operated by means of the cam 125 of the cam disc 126 which is mounted on the drum shaft 1. Therewith the mono-stable switch 127 is reversed, which has a reversal time of several milliseconds. When the switch 127 is switched on, the bi-stable switches 129 and 130 are reversed simultaneously via the conductor 128 which switches remain in this position. Thereby the clutch magnets 133 and 134 are energized via the conductors 131 and 132, and release the clutches 122 and 123. Therewith the shafts 135 and 136 of the toothed tape drive rollers 137 and 138 are clutched to the motors 118 and 119, and the magnetic tape 111 begins to move at the recording and playback end. Corresponding to the different speeds of the motors 118 and 119, the tape moves in the assumed example at the recording end at 2.86 times the speed at the playback end. Thereby the length of magnetic tape between the recording and playback end is increased for the present and the balancing loop 183 becomes longer.

A few milliseconds after the start of the tape 111, the mono-stable switch 127 has returned into its rest position. A pulse results in the conductor 139 which pulse has brought the switch 140 into its operative position. The gates 142 and 143 located in the conductors 144 and 145, have been opened via the conductor 141. The two conductors are the output conductors of the frequency divider 114, which supplies timing pulses of the frequency 9532 c./s. However, the pulses in the two conductors 144 and 145 are shifted in phase to each other half a timing period. The first timing pulse in the conductor 144 which passes the gate 142, opens those AND-gates 101 to 105 which were prepared by means of the binary voltage combination being present at this instant in the output conductors 8 of the coding device 7. The corresponding magnetic heads 106 to 110 are thereby put into operation to record a track each on the tape of a length equivalent to one picture point. An A.C. voltage of a frequency high in comparison with the picture point frequency, is used for the magnetization, said voltage being supplied by the generator 146 via the opened gates 101 to 105 to the operative heads of the magnetic heads 106 to 110. Thus magnetic areas 184 are produced on the magnetic tape 111, the breadth of such areas being equal to the length of the gap of a recording head and the length of which is equal to the size of a picture point. With every new picture point a new magnetic area combination is produced.

The pulses reaching the timing head 148 via the gate 143 and the conductor 147 record on the tape, as a sixth track, magnetic dashes 185 which are narrow compared with the magnetic areas of the information tracks and are in alignment with the middle lines of the areas. Therefore the timing pulses in the conductor 145 must be displaced in phase half a timing period compared with those in the conductor 144. The drawing shows the "magnetic picture" of a picture line stored in this way between the recording heads 106 to 110 and the playback heads 157 to 161.

When the recording of a picture line is terminated, the limit contact 149 closes momentarily which contact is operated by means of the cam 150 of the cam disc 151 which is mounted on the drum shaft 1, and causes the mono-stable switch 152 to reverse. A pulse arises in the conductor 153 which pulse bring the switch 140 into its rest position. Therewith the conductor 141 becomes dead, and the gates 142 and 143 are closed. The magnetic heads 106 to 110 and the timing head 148 are no longer effective, so that the magnetic tape thereafter remains unmagnetized. A few milliseconds later the switch 152 reverses and also brings the switch 129 into its rest position by means of a pulse via the conductor 154. The clutch magnet 133 releases the lock pawl 155, and the tape drive roller 137 is stopped. The magnetic tape 111 rests at the recording end. Between the end of the magnetic recording and the location of the recording heads, a small unmagnetized after-run portion 156 remains disengaged on the tape 111.

At the playback end, the playback heads 157 to 161 are at the moment of starting, on an unmagnetized portion 186 of the tape 111, namely within the after-run range of the picture line stored during the preceding cycle. If the tape transport is advanced a little, the timing track of the picture line previously stored then reaches the sixth playback head 162. Until now the playback heads 157 to 161 were also dead, since the tape was not magnetized. Whenever the first magnetic timing dash of the sixth timing track induces a voltage pulse in the playback head 162, voltages are also induced in the playback heads 157 to 161 corresponding to the magnetic recordings in their tracks. To every further timing pulse a five-unit combination of magnetized areas is assigned which induces a coresponding combination of voltages in the five playback heads 157 to 161. Said induced voltages reach the gates 164 to 168 by way of the cable 163. At every timing pulse in the conductor 169, the prepared gates release the present voltage combination to the decoding device 79. From there the recording member 84 is fed by means of the digital-analogue converter 81 which member records a picture point on the recording carrier 86 tensioned on the reproduction drum 85. Thus, all picture point information stored successively on the tape 111, are picked up and recorded until finally the last information has passed the playback heads.

The timing pulses picked up by the playback head 162 have kept the switch 171 in its operative position during the whole scanning period via the conductor 169 and the detecting amplifier 170. When the timing pulses have ceased, the switch 171 returns into its rest position. Thereby a pulse arises in the conductor 172 which pulse also reverses the switch 130 into its rest position. Thereby the conductor 132 and the clutch magnet 134 also become dead, and the clutch pawl 173 locks the shaft 136 carrying the tape drive roller 138. The tape drive therefore stops.

The time constants of the detecting amplifier 170, of the switches 130, 171, and of the clutch magnet 134 are so proportioned that the tape 111 moves only a slight distance after the storage area of the last picture point store has been left, said distance being smaller than the unmagnetized part of the tape between the end of one line and the beginning of the next. The portion of magnetic tape located below the scanning heads 157 to 161 is therefore not magnetized.

A short time after the rotating drums 1 and 85 carrying the picture original 2 and the recording carrier 86, have completed one revolution and begin the next. With the renewed operation of the contact 124 and a new start of the magnetic tape 111 at the reading-in and reading-out end, a new cycle begins. While a new picture line is being scanned on the picture original and is being stored in the described way, the picture line which has just been magnetically stored, is played back by means of the playback heads 157 to 161 and recorded on the recording carrier 86 by means of the recording member 84. This process is repeated until the whole picture original 2 is scanned and the equipment is stopped, for example by means of a limit switch operated by the advance movement of the optical scanning system. During the individual drum revolutions, the whole recording and playback process is controlled, as has been mentioned, by means of the cams 125 and 150. They are so adjusted according to the original 2, that the cam 125 operates the contact 124, directly before the scanning beam has reached the edge of the picture original and that the cam 150 closes the contact 149, directly after the scanning beam has left the original. With enlargement i.e. with a small original, as in the example, the angular distance between the cams 125 and 150 and also the time between their working points is relatively small, so that the tape is driven for only a short time. By a correspondingly high speed of rotation of the motor 118, a sufficient tape length must be driven in this short time. During the rest of the time of the drum rotation the tape remains stationary in front of the recording heads. The extension of the picture line for the purpose of enlargement is therefore effected by rapid recording with comparatively fast tape speed and by slow playback with relatively slow tape speed. During the recording the portion of tape between the recording and playback heads is increased and has its greatest length at the end of the recording. This excess tape length is taken up in the loop 183.

With reductions i.e. with a large picture original, the cams 125 and 150 are spaced correspondingly far from each other. The drive of the tape 111 at the reading-in end progresses more slowly than at the playback or reading-out end. Thereby the tape loop 183 between the recording and playback heads is increased. The picture line is compressed. The tape lengths changing during each line transmission are balanced in the loop 183, the length of which is enlarged or reduced correspondingly.

The part of the tape disposed at the starting point of a new picture line transmission between the recording and playback end, should be able to store a picture line with the highest occurring number of picture points. This should be, for example, 3500 picture points. If there is provided, furthermore, for the storage of one picture point information, a tape length of about 0.2 mm., then the longest required length of magnetic tape is 70 cm. If one makes an increase of 10 cm. for the unused i.e. unrecorded tape sections for the pre-run and after-run, the amount of tape necessary for a picture point line is then 80 cm. long. With an extreme reduction ratio 4:1 the recording and playback heads may be spaced at a distance of 20 cm. from each other. The remaining tape length of 60 cm. form the equalizing loop. From what has been said, it will be clear that more than one picture line distance between the recording and the playback heads is not necessary.

In the previous considerations, it had been assumed that the transmission has already been started, for which the description is adequate. For the transmission of the first line, however, this does not hold true, for the reason that the portion of the tape scanned after the start of the first line, contains no storage to be recorded. Therefore, the disconnection of the tape drive associated with the criterion: "end of the scanned timing pulses by means of the playback head 162," which disconnection occurs, as has been mentioned, by the reversal of the switch 130, fails to take this condition into consideration. In order to also stop the tape drive for the first cycle, and that at approximately the right place, there is provided the cam disc 174, with the cam 175, which is adjustably arranged on the shaft of the reproduction drum 85, which cam operates the contact 176. The cam disc 174 is so adjusted that the contact 176 closes at the moment when the revolving edge of the recording carrier 86 leaves the recording member 84. In most cases this stopping point is not quite identical with the stopping point determined by means of the picture timing via the playback head 162 and the switch 171. Therefore, the first picture line will not be recorded unless allowance is made for a possible small displacement of this first line as against the other lines. The recording of the first line is suppressed by the gate 177 located in the conductor 83. This is opened only after the completion of the second drum revolution after the equipment has been started. This occurs with the aid of the contact 176 and of the counting switch 178 which supplies voltage to the conductor 180 only after two excitations which opens the gate 177 for the continuation of the transmission, and which effects the feeding of the recording member 84. The switch 130 is brought into its rest position via the conductor 179.

Up until now the question of the consumption of the magnetic tape has not been considered. It was assumed that the tape, before it reached the recording heads 106 to 110, was not magnetized. For this purpose the erasing device 181 is provided which is arranged in front of the recording head. Said erasing device supplies a magnetic alternating field, the lines of force of which permeate the magnetic tape, so that any existing recording is destroyed. The erasing device is important, if the tape is endless, i.e., if it is led back after leaving the playback heads in the form of a loop to the recording heads and is used again for transmission. The erasing device then destroys all previously read-in picture point informations and renders the tape capable of storing new picture lines.

The system can be arranged so that the tape runs from a supply roller and is long enough to allow a whole picture to be stored. In the latter case it is possible for the picture to be reproduced at later times at a different enlargement ratio.

Two different endless tapes may alternately be provided, which are used alternately, one for storing the odd-numbered and the other for storing the even-numbered picture lines. While the then recorded tape is played back, the neutral tape is recorded. Compensating loops 183 may then be dispensed with.

Up until now the storing and reproduction of analogue picture signals which is only possible with the aid of a magnetic tape, has not been mentioned. At first, this would appear obvious because of the omission of the complicated analogue-digital and digital-analogue converters and of the coding and decoding devices. It should not be unmentioned that the performance of this concept brings about considerable difficulties. These are not based on the fact that, with changed reproducing speed, picture frequency shifts occur which, however, are not of great importance, since it is the matter of picture signals and not of acoustic signals the frequencies of which would be of importance. On the contrary, the difficulty lies in the fact that, with the analogue-storage and reproduction, a timing controlling the individual processes, is not present. Thereby the exact determination in time of the beginning and end of the individual processes within a transmission cycle becomes questionable.

The consequence is that the individual picture lines of the reproduction are insignificantly laterally displaced to each other in an uncontrollable manner to which the eye is very sensitive.

The new method of reproduction with steadily variable reproduction scale by different adjustment of the reading-in and reading-out speed of the scanned picture signals has previously been described only in connection with drum apparatus, with which the method is meaningful.

However, one could also consider employing the method according to the invention in connection with flat bed apparatus. Original and reproducing tables would then be coupled rigidly together, and the adjustable swing lever mechanisms to give the two tables different strokes and speeds are omitted. Such procedure would indeed be possible, but not meaningful. For the known swing lever mechanisms allow any selected gear ratio of both table strokes or speeds to be adjusted exactly and to be maintained for a long time with great constancy. Moreover, said mechanisms are much cheaper than the expensive storage electronics.

Changes may be made within the scope and spirit of the appended claims which define what is believed to be new and desired to have protected by Letters Patent.

What we claim as new and desire to secure by Letters Patent is:

1. A method of recording picture signals obtained by scanning picture originals to be reproduced, with continuously variable reproduction scale, using rotating drums for tensioning the picture original and the recording carrier, comprising the steps of rotating the drums at the same speed, scanning a picture original on the one drum to translate such picture original into a series of picture signals, storing the picture signals, reading out the stored picture signals, recording a picture reproduction on a recording carrier on the drum by means of said read-out picture signals, adjusting the relative speeds at which the storage and subsequent read-out of the picture signals take place, dependent upon a selected line density, to provide a desired reproduction ratio between the picture original and the reproduction thereof.

2. A method as defined in claim 1, wherein the storage of said picture signals is effected with the signals in analogue form.

3. A method as defined in claim 1, wherein the picture signals are stored digitally, comprising the additional step of quantizing and coding said signals prior to storage.

4. A method as defined in claim 1, wherein said storage is effected to store at most, the pitcure points of the longest possible picture line of the greatest possible density.

5. A method as defined in claim 1, weherein a storage capacity of only a single line is effected, the individual picture lines being stored successively, comprising the step for each line, in the case of a reproduction scale of 1:1 and larger, of effecting read-out of a storage taking place, only after the first picture point of a picture line has been read-in, and in the case of reduction, effecting read-out only after a sufficient number of picture points have been read-in that the read-out of a complete line ends later, by at least the duration of the read-in of one picture point, than the read-in of the last picture point of said line.

6. A method as defined in claim 1, comprising effecting a storage of the entire picture before read-out of the stored picture signals.

7. An apparatus for recording picture signals obtained by scanning pitcure originals to be reproduced with continuously variable reproduction scale, comprising a first rotatable drum on which the picture original is to be tenisoned, and a second rotatable drum on which the recording carrier is to be tensioned, means for rotating the respective drums at the same speed, means for scanning a picture original carried by the first drum, for translating the picture original into a series of picture signals, means for storing such picture signals, means operatively connecting said scanning and storage means for reading-in such picture signals into the storage means, recording means for translating such pitcure signals into a picture reproduction on such a recording carrier on the second drum, means operatively connecting said storage means and said recording means for reading-out picture signals from said storage means and feeding the same to said recording means, and means for varying the ratio between the operating speeds of the signal entry and withdrawal means whereby the reproduction scale may be varied by adjustment of such ratio between the speed of storage entry and storage withdrawal of said picture signals.

8. An apparatus as defined in claim 7, wherein said storage means comprises a magnetic tape.

9. An apparatus as defined in claim 7, wherein said storage means comprises ring core matrices.

10. An apparatus as defined in claim 7, wherein said storage means comprises two line stores, one of which stores the odd-numbered and the other which stores the even-numbered picture lines, said read-in and read-out means being operable to effect a read-out of a filled storer while the then empty storer is read-in.

11. An apparatus as defined in claim 7, wherein said storage means comprises a single line storer, in which the individual picture lines are successively stored, and means for controlling said read-in and read-out means operative, in the case of a reproduction scale of 1:1 and larger, to effect a read-out of a storage taking place only after the first picture point of a picture line has been read-in, and in the case of reduction, to effect a read-out only after a sufficient number of picture points have been read-in that the read-out of a complete line ends later, by at least the duration of the read-in of one picture point, than the read-in of the last picture point of said line.

12. An apparatus as defined in claim 7, wherein said storage means has a storage capacity sufficient to store all the picture points of the original.

13. An apparatus as defined in claim 7, wherein said storage means is constructed to store the picture signals in analogue form.

14. An apparatus according to claim 7, wherein said storage means is constructed to store the picture signals in digital form, and means, operatively disposed between said scanning means and said means for reading-in said signals, for quantizing and coding said signals prior to entry into said storage means, and means operatively disposed between said read-out means and said recording means for translating the read-out signals into analogue form.

15. An apparatus defined in claim 14, wherein said storage means is constructed in the form of ring-core matrices, and reading-out of said storage means, and timing means operatively connected to said counter means for controlling the operational timing of said counter means.

16. An apparatus as defined in claim 14, wherein said storage means is constructed in the form of a magnetic tape, comprising timing means, operatively connected to said read-in means, the latter being operative to effect a storage of timing signal means in said storage means along with picture signals, and said read-out means being operative to effect a reading-out of said timing signals, and means responsive to the timing signals read-out for controlling operation of said storage means.

17. An apparatus as defined in claim 14, comprising means operatively connected to said timing means actuatable by rotation of said first drum for controlling the operation of said timing means.

No references cited.

DAVID G. REDINBAUGH, *Primary Examiner.*

H. W. BRITTON, *Assistant Examiner.*